form.

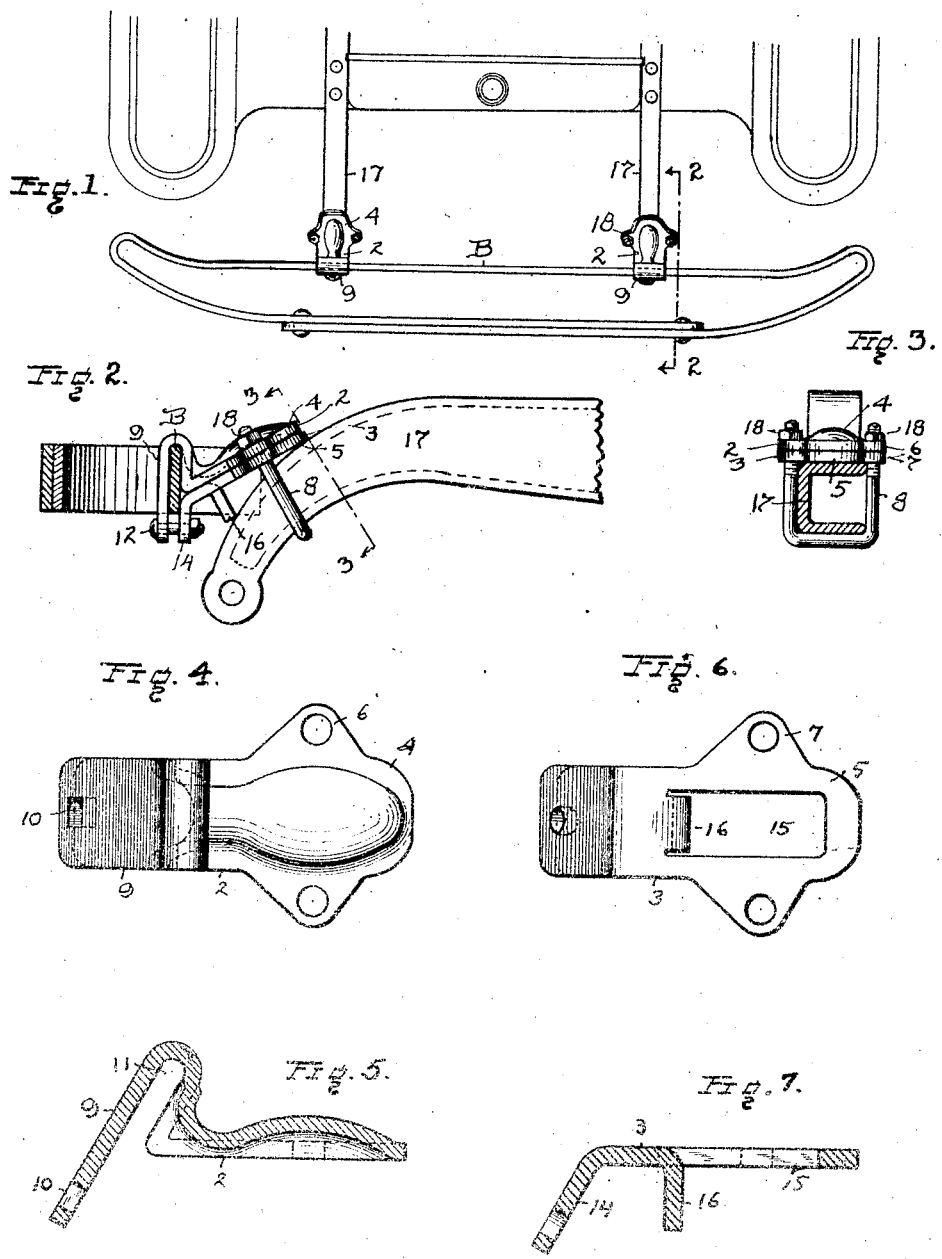

UNITED STATES PATENT OFFICE.

WILLIAM G. COX, OF CLEVELAND, OHIO.

BRACKET FOR SPRING-BAR BUMPERS.

1,391,373.  Specification of Letters Patent.  Patented Sept. 20, 1921.

Application filed July 5, 1921. Serial No. 482,331.

*To all whom it may concern:*

Be it known that I, WILLIAM G. Cox, a citizen of the United States, residing at Cleveland, in the county of Cuyahoga and State of Ohio, have invented certain new and useful Improvements in a Bracket for Spring-Bar Bumpers, of which the following is a specification.

This invention relates to a bracket for automobile bumpers, and the object of the invention is to provide a bracket made in two plates particularly constructed to be attached in rest and thrust position upon the curved ends of the side members of an automobile frame, and the bracket is also constructed to permit its convenient adaptation and attachment to the side members of frames of different curvature and to support the bumper at different elevations and the desired angles relatively to the frame.

In the accompanying drawing, Figure 1 is a plan view of an end portion of an automobile showing a spring bar bumper attached by my bracket thereto. Fig. 2 is an enlarged side elevation and cross section on line 2—2, of Fig. 1. Fig. 3 is a transverse section on line 3—3, of Fig. 2. Fig. 4 a plan view of the upper member of the bracket, and Fig. 5 is a sectional view of said member. Fig. 6 is a plan view and Fig. 7 a sectional view of the bottom member of the bracket.

The bracket comprises two metal stampings or forgings 2 and 3 respectively, and both members or plates have flat-faced body portions 4 and 5 respectively with perforated ears 6 and 7 respectively through which the legs of a U-bolt 8 are adapted to project when said members are mounted upon each other with the perforations in the ears in register. Upper member 3 is pressed into a partly concavo-convex form in its main body portion 4 to give it rigidity and strength, and the front end member 2 is bent into the form of a tongue at an acute angle upwardly and thence rounded and projected downwardly to provide a spring clamping tongue 9 having a square bolt opening 10 near its lower extremity. The gap or space 11 between tongue 9 and the main body portion 4 of bracket member 2 is adapted to receive a seat and flat bumper bar B and clamping of said bar within the bumper bracket is effected by a bolt and nut 12 passing through a short spring tongue 14 extending at an angle from the front end of bottom member 3. This member 3 has an elongated opening 15 in its main body portion and a lip or flange 16 bent downwardly at the front end of opening 15. Flange 16 serves as a rest for the bracket when the two members 2 and 3 are mounted upon each other and jointly secured on the curved end of the side members 17 of an automobile frame by U-bolt 8 which passes under the frame and is clamped tightly thereto when the nuts 18 are screwed down to their limit. The curved ends of side member 17 vary in shape or curvature in different machines and the bumper can be tilted or placed in a horizontal plane by raising or lowering the front end of the bracket either by bending flange 16 to a different angle relatively to the bottom face of bottom member 3 or by cutting said flange 16 to different lengths. U-bolt 8 serves to clamp the two bracket members upon the rounded top face of the side 17, and bolt 12 is adapted to clamp the bumper between the tongue ends of the two bracket members. The relation of flanges 16 to the bumper is such that any impact on the bumper will be transmitted squarely through the bracket members to the frame end 17. Viewed from the front and above the bracket members finish and embellish the front ends of frame 17, and provide a very simple and easily attached device which will securely hold a bumper in a rigid position upon the frame of the vehicle.

What I claim is:

1. A bracket for spring-bar bumpers, comprising a pair of clamping members adapted to be placed in facial engagement in rest position upon an extended portion of the frame of a vehicle, and a clamping device for said members adapted to secure a bumper between said bracket members and upon said vehicle frame.

2. A bracket for spring bar bumpers, comprising a pair of separable members having spring tongues adapted to clamp a bumper bar between them, clamping means for said spring tongues and a clamping device adapted to secure said members jointly upon an extended portion of a vehicle frame.

3. A bracket for spring bar bumpers, comprising an upper member having a spring clamping tongue, a bottom member having a spring clamping tongue, a clamping bolt for the ends of said tongues and a U-bolt adapted to clamp said members jointly together upon the projecting portion of an automobile frame.

4. A bracket for spring bar bumpers, comprising a pair of clamping plates having spaced clamping tongues at one end thereof and a projecting lip at the bottom of one of said members adapted to support said member upon a portion of an automobile frame, and a clamping bolt adapted to secure said parts together.

5. A bracket for spring bar bumpers, comprising an upper plate having a bent clamping extremity, a bottom plate having a bent extremity and a downwardly projecting lip, a bolt adapted to secure the extremities of said plates together and a U-bolt adapted to fasten said plates jointly upon a curved member of an automobile frame with said lip in contact with the curved surface.

6. A bracket for spring bar bumpers, comprising a plate having a concavo-convex main portion and a reversely bent extremity providing a clamping tongue, a second plate having a short clamping tongue and provided with a downwardly bent lip within its main body portion, means adapted to clamp said plates together upon an automobile frame and means adapted to clamp a bumper bar between the clamping extremities of said members.

WILLIAM G. COX.